United States Patent Office 3,142,654
Patented July 28, 1964

3,142,654
BUTADIENE-STYRENE-ACRYLATE LATEX TERPOLYMER
William R. Peterson and Donald A. Walker, Baytown, Tex., assignors, by mesne assignments, to Ashland Oil & Refining Company, Ashland, Ky., a corporation of Kentucky
No Drawing. Filed Aug. 30, 1960, Ser. No. 52,791
8 Claims. (Cl. 260—29.7)

This invention relates to synthetic rubber-like latexes. More particularly, it relates to freeze-thaw stable, mechanically stable synthetic rubber-like latexes, water-containing coating compositions containing such latexes and coatings prepared from such compositions.

In recent years, water dispersion paint compositions in which synthetic latexes prepared by emulsion polymerization are employed as binders have become widely accepted for both inside and outside applications. The advantages in application as well as the desirable characteristics of the resultant coatings or films are well recognized both within and without the paint manufacturing industry. Such paint compositions, however, are plagued by certain disadvantages not the least of which is their general inability to withstand reduced temperatures ranging from freezing to considerably below freezing. Under such temperature conditions, thickening or coagulation occurs rendering the compositions useless for coating purposes.

Both latex and paint manufacturers, therefore, have been confronted with the necessity of improving the freeze-thaw resistance or stability of paint latexes and paint compositions to an extent sufficient for such products to withstand naturally and frequently occurring low temperatures without detriment. To this end, it has been the general practice to incorporate any of various protective colloids as post polymerization stabilizing agents, with or without a freezing point depressant such as ethylene glycol. Certain of such colloids have shown excellent stabilizing properties and have received wide commercial acceptance. Still others, however, have not been completely satisfactory because they do not provide adequate protection at the more reduced temperatures, or may provide protection to the paint latex, per se, but not the paint composition, or for any of various other reasons. There has continued to remain, therefore, a demand for improved means of providing latexes and paint compositions having improved freeze-thaw properties.

Surprisingly, it has now been discovered, in accordance with this invention, that certain styrene-butadiene-acrylate polymer latexes exhibit an inherent freeze-thaw stability of a nature heretofore unrealized in conventional styrene-butadiene paint latexes except in the presence of post polymerization stabilizers. The invention is particularly unusual in that the highly desirable inherent stability is demonstrated only by those terpolymers in which the acrylate phase comprises at least one of either butyl acrylate or 2-ethyl-hexyl acrylate. Other lower alkyl acrylates as well as methacrylates when used along as the acrylate phase fail to produce an improved stabilization of any significance, although certain of them when used in conjunction with either the butyl or 2-ethylhexyl derivative provide latexes of excellent stability.

An acrylate content of as little as 7% by weight of the polymer has been shown to improve the inherent stability of the latexes of the class described. Further improved and more consistent results are obtained at higher acrylate contents, i.e., about 10–35%. Considerably higher acrylate contents, i.e., as high as 65% and even higher, may be employed but no particular advantage is gained by the use of such high contents.

Acrylate contents beyond about 35%, moreover, tend to adversely affect film properties such as scrub resistance. In accordance with this invention, therefore, the acrylate content should preferably range from about 7–25%, an optimum being about 12–25%. When other lower alkyl acrylates or methacrylates are employed in admixture with either the butyl or 2-ethylhexyl derivative, the composition of the total acrylate content may vary and will depend to some extent on the particular other acrylate employed. In general, however, it can be stated that the butyl or 2-ethylhexyl derivative will comprise at least about 50% of the total acrylate content. Other acrylates which have been found to be particularly effective in providing the desired results when they are employed in admixture with the butyl and 2-ethylhexyl acrylates are ethyl acrylate and methyl methacrylate. Admixtures of the butyl and 2-ethylhexyl derivatives, of course, also provide the same unique results obtained as when either is used alone. It has further been surprisingly found in accordance with this invention, that the relative proportions of styrene and butadiene must be restricted. Thus, in order to achieve an inherently freeze-thaw stable latex, the proportion by weight of styrene to butadiene should be maintained from about 1.0–1.75, preferably from about 1.2–1.5.

The latexes of this invention may be employed as the binder in any water dispersion paint composition, the latter forming no part of this invention except to the extent that one of the present latexes may comprise the binder thereof. Such compositions will principally comprise a water dispersed paint pigment, colored if desired, and a latex as herein described in concentrations known in the art. Coatings prepared from compositions containing the latex binders hereof exhibit excellent properties, that of water resistance being particularly outstanding. The particular method of preparing water dispersion paint compositions comprising the present latexes forms no part of this invention and may be any method employed in the paint formulation art.

The following examples further illustrate the invention. In these examples, the test procedure for determining freeze-thaw stability comprises placing a sample of a paint latex or a water paint composition prepared therefrom in a covered metal container and then placing the container in a refrigerated compartment for 16 hours at the test temperature of −29° C. After 16 hours, the container is removed and the frozen contents permitted to thaw at room temperature. When the contents reach room temperature, they are observed for coagulation and viscosity variation. The contents are then resubjected to the same procedure until coagulation occurs or until four cycles are completed. All parts are by weight unless otherwise noted.

EXAMPLE 1

A plurality of latexes according to the compositions of Table I are prepared by emulsion polymerization. Reaction temperature is 150° F. and reaction time 14 hours. Samples of each latex are then tested for freeze-thaw stability. Results appear in Table I.

*Table I*

| Monomer (Parts by Wt.) | Latex Sample Number | | | | | |
|---|---|---|---|---|---|---|
| | 1 | 2 | 3 | 4 | 5 | 6 |
| Styrene | 62 | 40 | 51 | 62 | 40 | 51 |
| Butadiene | 31 | 53 | 42 | 15 | 37 | 26 |
| Butyl acrylate | 7 | 7 | | | | 23 |
| 2-Ethylhexyl acrylate | | | 7 | 23 | 23 | |
| S/Bd ratio | 2.0 | 0.76 | 1.21 | 4.1 | 1.08 | 1.96 |
| Number of cycles before coagulation | 1 | 1 | 2 | 1 | 1 | 1 |

EXAMPLE 2

The procedure of Example 1 is repeated except that the latex compositions are changed as in Table II.

*Table II*

| Monomer (Parts by Wt.) | Latex Sample Number | | | | | | |
|---|---|---|---|---|---|---|---|
| | 1 | 2 | 3 | 4 | 5 | 6 | 7 |
| Styrene | 60 | 50 | 47.5 | 47.5 | 50 | 50 | 40 |
| Butadiene | 28 | 38 | 40.5 | 40.5 | 38 | 38 | 48 |
| Butyl acrylate | 12 | 12 | 6 | 6 | 10 | | |
| 2-Ethylhexyl acrylate | | | 6 | | | 10 | 12 |
| Methyl methacrylate | | | | 6 | | 2 | |
| Ethyl acrylate | | | | | 2 | | |
| S/Bd ratio | 2.14 | 1.35 | 1.17 | 1.17 | 1.35 | 1.35 | 0.84 |
| Number of cycles before coagulation | 1 | >4 | >4 | >4 | >4 | >4 | 1 |

EXAMPLE 3

The procedure of Example 1 is repeated except that the latex compositions are changed as in Table III.

*Table III*

| Monomer (Parts by Wt.) | Latex Sample Number | | | | | | | |
|---|---|---|---|---|---|---|---|---|
| | 1 | 2 | 3 | 4 | 5 | 6 | 7 | 8 |
| Styrene | 59 | 59 | 49 | 49 | 49 | 49 | 39 | 39 |
| Butadiene | 27 | 27 | 37 | 37 | 37 | 37 | 47 | 47 |
| Butyl acrylate | 14 | 6 | 14 | 6 | | | | 14 |
| 2-Ethylhexyl acrylate | | 8 | | 8 | 14 | 12 | 14 | |
| Methyl methacrylate | | | | | | 2 | | |
| S/Bd ratio | 2.18 | 2.18 | 1.33 | 1.33 | 1.33 | 1.33 | 0.83 | 0.83 |
| Number of cycles before coagulation | 1 | 1 | >4 | >4 | >4 | >4 | 1 | 1 |

EXAMPLE 4

The procedure of Example 1 is repeated except that the latex compositions are changed as in Table IV.

*Table IV*

| Monomer (Parts by Wt.) | Latex Sample Number | | | | | | | |
|---|---|---|---|---|---|---|---|---|
| | 1 | 2 | 3 | 4 | 5 | 6 | 7 | 8 |
| Styrene | 57 | 47 | 50 | 50 | 37 | 41 | 51 | 31 |
| Butadiene | 26 | 36 | 33 | 33 | 46 | 32 | 22 | 42 |
| Butyl acrylate | 17 | 17 | | 17 | | | | |
| 2-Ethylhexyl acrylate | | | 17 | | 17 | 27 | 27 | 27 |
| S/Bd ratio | 2.19 | 1.31 | 1.51 | 1.51 | 0.81 | 1.41 | 2.32 | 0.74 |
| Number of cycles before coagulation | 1 | >4 | >4 | >4 | 1 | >4 | 1 | 1 |

EXAMPLE 5

The various freeze-thaw stable latexes of Examples 1–4 are incorporated into interior paint compositions of the following formulation:

| Ingredient: | Parts by weight |
|---|---|
| Tamol 731 (Na salt of a carboxylated polyelectrolyte) | 1 |
| Hot water | 65 |
| Methyl cellulose | 3 |
| Cold water | 105 |
| Dowicide A (Na salt of O-phenyl phenol) | 3.5 |
| Titanium dioxide | 215 |
| China clay | 50 |
| Talc | 260 |
| Tripotassium phosphate | 4 |
| Water | 160 |
| Latex (48% solids) | 338 |

The Tamol 731 is dissolved in hot water and the methyl cellulose added with agitation until dispersed. The dispersion is diluted with cold water and the Dowicide A stirred in. The dry pigments are then stirred in adding water as required for proper mixing consistency. The remaining water is then added to the resultant paste and the latex stirred in. The water-containing coating compositions thus formed are then treated for freeze-thaw stability and each one found to have a stability similar to that of its latex component as illustrated in the preceding examples. The compositions flow freely and are readily applied to an interior surface to give coatings exhibiting excellent adhesion and resistance to water. Although the instant example is directed to interior paint compositions, it should be understood that the latexes of this invention are just as applicable in the preparation of freeze-thaw stable exterior paint compositions. The latter, moreover, because of the acrylate comonomer, exhibit reduced chalking tendency while at the same time retaining the excellent color pigment acceptance properties of styrene-butadiene latexes.

Although a principal object of this invention is to provide post stabilizer-free, freeze-thaw stable water dispersion paint compositions, it is also a principal object of this invention to provide improved paper coating compositions. Such compositions must necessarily be mechanically stable so as to withstand the high shear imposed thereon in any of the various methods used to apply them to paper. Because of the surprisingly inherent mechanical stability of the present latexes, they are particularly suited for use as binders for the pigments employed in paper and paper board coating compositions. The range of acrylate content and ratio of styrene to butadiene at which mechanical stability is obtained appear to be slightly greater than, although in general similar to, those at which freeze-thaw stability is obtained. Thus, reasonably good and consistent mechanical stability may be obtained at slightly lower, i.e., about 7%, acrylate contents provided the styrene-butadiene ratio is greater than about 1.2, and also at slightly lower, i.e., about 0.75, styrene-butadiene ratios provided the acrylate content is at least about 15%, preferably 17–25 percent. In general, however, the ranges and ratios set forth with respect to freeze-thaw stability would as a practical matter be practiced in seeking mechanical stability for paper coatings.

The coating of paper using compositions containing as binders the latexes of this invention result in glossy, smooth films having high bonding strength. Such films, moreover, exhibit excellent wet rub resistance and pick performance as well as excellent printing performance especially in high speed letter press printing.

The latexes of this invention may be used in any pigmented paper coating composition, the latter forming no part of this invention except to the extent that one of the described latexes may comprise the binder therefor. Pigments with which the present latexes may be employed are any of those conventionally employed in paper coating compositions such as China clay, English clay, calcium carbonate, titanium dioxide and the like. The latexes may be used alone or in admixture with any of the usually employed natural binders such as starch, casein, alpha protein and the like. Coating compositions containing the instant latex binders will contain the usual solids and binder contents and may be applied to paper by any of the conventional means either on or off the paper making machine.

The following examples further illustrate the invention. In these examples, the mechanical stability is determined by violently agitating a latex for 15 minutes. If no coagulum appears after 15 minutes, the latex is judged mechanically stable.

EXAMPLE 6

A plurality of latexes according to the compositions of Table V are prepared by emulsion polymerization. Reaction temperature is 150° F. and reaction time 14 hours. Samples of each latex are then tested for mechanical stability. Results appear in Table V. Plus (+) and minus (—) signs indicate stable and unstable latexes, respectively.

*Table V*

| Monomer (Parts by Wt.) | Latex Sample Number | | | | | | | | |
|---|---|---|---|---|---|---|---|---|---|
| | 1 | 2 | 3 | 4 | 5 | 6 | 7 | 8 | 9 |
| Styrene | 46 | 53 | 60 | 40 | 50 | 60 | 37 | 47 | 57 |
| Butadiene | 47 | 40 | 33 | 48 | 38 | 28 | 46 | 36 | 26 |
| Butyl acrylate | 7 | 7 | 7 | 12 | 12 | 12 | 17 | 17 | 17 |
| S/Bd ratio | 0.98 | 1.32 | 1.82 | 0.83 | 1.31 | 2.14 | 0.8 | 1.3 | 2.2 |
| Mechanical stability | − | + | − | − | + | − | + | + | − |

EXAMPLE 7

The procedure of Example 6 is repeated using the compositions set forth in Table VI. Results appear in Table VI.

*Table VI*

| Monomer (Parts by Wt.) | Latex Sample Number | | | | | | | | |
|---|---|---|---|---|---|---|---|---|---|
| | 1 | 2 | 3 | 4 | 5 | 6 | 7 | 8 | 9 |
| Styrene | 40 | 50 | 60 | 37 | 47 | 57 | 31 | 41 | 51 |
| Butadiene | 48 | 38 | 28 | 46 | 36 | 26 | 42 | 32 | 22 |
| 2-Ethylhexyl acrylate | 12 | 12 | 12 | 17 | 17 | 17 | 27 | 27 | 27 |
| S/Bd ratio | 0.83 | 1.31 | 2.14 | 0.81 | 1.3 | 2.19 | 0.74 | 1.28 | 2.4 |
| Mechanical stability | − | + | − | + | + | − | + | + | − |

EXAMPLE 8

The procedure of Example 6 is repeated using the compositions set forth in Table VII. Results appear in Table VII.

*Table VII*

| Monomer (Parts by Wt.) | Latex Sample Number | | | | | | | | |
|---|---|---|---|---|---|---|---|---|---|
| | 1 | 2 | 3 | 4 | 5 | 6 | 7 | 8 | 9 |
| Styrene | 40 | 50 | 60 | 37 | 47 | 57 | 31 | 41 | 51 |
| Butadiene | 48 | 38 | 28 | 46 | 36 | 26 | 42 | 32 | 22 |
| Butyl Acrylate-Methyl methacrylate (1:1) | 12 | 12 | 12 | 17 | 17 | 17 | 27 | 27 | 27 |
| S/Bd ratio | 0.83 | 1.31 | 2.14 | 0.81 | 1.3 | 2.19 | 0.74 | 1.28 | 2.4 |
| Mechanical stability | − | + | − | + | + | − | + | + | − |

EXAMPLE 9

When the procedure of Example 6 is repeated using mixtures of butyl acrylate and 2-ethylhexyl acrylate, mixtures of 2-ethylhexyl acrylate with ethyl acrylate or methyl methacrylate, and mixtures of butyl acrylate with ethyl acrylate, results similar to those of Examples 6–8 are obtained using similar acrylate concentrations and styrene butadiene ratios.

EXAMPLE 10

The mechanically stable latexes of Examples 6-8 are compounded into paper board coating compositions of the following formula:

| Ingredient— | Parts by weight |
|---|---|
| Clay | 94 |
| Titanium dioxide | 6 |
| Calgon (a sodium phosphate glass) | 0.4 |
| Ammonium hydroxide | 0.2 |
| Latex solids | 15.5 |
| Water | 182 |

The Calgon is added with moderate agitation to the water and ammonium hydroxide after which the clay and titanium dioxide are added with violent agitation. When a good dispersion is obtained, the latex is added. The compositions obtained exhibit excellent mechanical stability when applied to paper board while the resultant films have good printing, pick resistance and wet rub resistance properties.

The method of preparing the present latexes forms no part of this invention. In general, however, the method involves emulsion polymerization of the monomers using any of various emulsifying systems, initiators, electrolytes and the like, all of which are well known to those skilled in the art. A particular method by which the latexes of this invention may be prepared is disclosed in U.S. Patent No. 2,605,242. Modifiers exhibit no particular effect on the stability properties of the instant latexes and, accordingly, may or may not be employed as desired. Similarly, the levels of initiator and electrolyte do not markedly affect stability properties and may be modified as necessary.

We claim:

1. A freeze-thaw stable, mechanically stable styrene-butadiene-acrylate terpolymer latex particularly adapted for use in water-containing coating compositions comprising about 10–35% by weight acrylate at least about 50% by weight of said acrylate being a member selected from the class consisting of butyl acrylate and 2-ethylhexyl acrylate, the remainder being at least one member selected from the class consisting of butyl acrylate, 2-ethylhexyl acrylate, ethyl acrylate and methyl methacrylate; and about 90–65% by weight styrene plus butadiene, the ratio by weight of styrene to butadiene being about 1.0–1.75:1.

2. A latex according to claim 1 in which the acrylate content is about 12–25% by weight, the styrene plus butadiene content about 88–75% by weight and the ratio of styrene to butadiene about 1.2–1.5:1 by weight.

3. A latex according to claim 1 in which the member comprising 50% by weight of the acrylate content is butyl acrylate.

4. A latex according to claim 1 in which the member comprising 50% by weight of the acrylate content is ethylhexyl acrylate.

5. A freeze-thaw stable, mechanically stable pigmented water-containing coating composition comprising water, a pigment and a styrene-butadiene-acrylate terpolymer latex comprising about 10–35% by weight acrylate at least about 50% by weight of said acrylate being a member selected from the class consisting of butyl acrylate and 2-ethylhexyl acrylate, the remainder being at least one member selected from the class consisting of butyl acrylate, 2-ethylhexyl acrylate, ethyl acrylate and methyl methacrylate; and about 90–65% by weight styrene plus butadiene, the ratio by weight of styrene to butadiene being about 1.0–1.75:1.

6. A composition according to claim 5 in which the acrylate content of the latex is about 12–25% by weight, the styrene plus butadiene content about 88–75% by weight and the ratio of styrene to butadiene about 1.2–1.5:1 by weight.

7. A composition according to claim 5 in which the member comprising 50% by weight of the acrylate content is butyl acrylate.

8. A composition according to claim 5 in which the member comprising 50% by weight of the acrylate content is ethylhexyl acrylate.

References Cited in the file of this patent

UNITED STATES PATENTS

| | | |
|---|---|---|
| 2,234,204 | Starkweather et al. | Mar. 11, 1941 |
| 2,279,293 | Clifford | Apr. 14, 1942 |
| 2,614,089 | Harrison et al. | Oct. 14, 1952 |
| 2,791,571 | Wheelock et al. | May 7, 1957 |
| 2,843,561 | Ingley et al. | July 15, 1958 |
| 2,908,658 | Graulich et al. | Oct. 13, 1959 |